United States Patent [19]
Race

[11] 3,769,926
[45] Nov. 6, 1973

[54] MARINE GALVANIC CONTROL CIRCUIT
[75] Inventor: Richard T. Race, Chicago, Ill.
[73] Assignee: Motorola, Inc., Franklin Park, Ill.
[22] Filed: Oct. 18, 1971
[21] Appl. No.: 189,861

[52] U.S. Cl. .................. 114/.5 R, 204/196, 307/95
[51] Int. Cl. ............................................. H01b 7/28
[58] Field of Search ............... 114/.5 R; 317/18 D; 307/95; 204/196, 147

[56] References Cited
UNITED STATES PATENTS
| | | | |
|---|---|---|---|
| 1,055,327 | 3/1913 | Hering | 307/95 |
| 3,383,520 | 5/1968 | Hoffman | 307/95 |
| 3,477,931 | 11/1969 | Veda et al. | 204/196 |
| 3,636,409 | 1/1972 | Stephens, Jr. et al. | 317/18 D |

Primary Examiner—Milton Buchler
Assistant Examiner—Jesus D. Sotelo
Attorney—Vincent Rauner et al.

[57] ABSTRACT

Apparatus for minimizing galvanic deterioration of the metallic hull of a ship moored at a dock of a dissimilar metal, and receiving electrical power from a power source grounded at the dock, includes a plurality of silicon diodes connected to an electrical power conductor grounded at the dock and at the metallic hull of the ship. The intrinsic junction voltage drop of the diodes is sufficient to block current flow due to the voltaic cell effect between the ship's hull and dock.

10 Claims, 2 Drawing Figures

PATENTED NOV 6 1973

3,769,926

MARINE GALVANIC CONTROL CIRCUIT

BACKGROUND OF THE INVENTION

This invention relates generally to Galvanic deterioration of the metallic hulls of water going vessels and more particularly to apparatus for the suppression of such hull deterioration.

The extensive use of aluminum in the construction of hulls for water going vessels has enlarged the problem of metallic hull deterioration due to the voltaic cell effect. The latter occurs when the hull of the ship which is immersed in water including the usual minerals, is docked adjacent a metallic pier and is connected electrically to a power source grounded thereat, or, in the case of a non-metallic pier, to the harbor bottom wherein the latter is in close proximity therewith. The hull, being a dissimilar material from the pier, and/or earth, and being immersed in an electrolyte, deteriorates Galvanically.

In connecting the ship to a shore power facility on the dock, the neutral connection from the distribution transformer on the dock is grounded thereat. The neutral line brought aboard the ship, however, is grounded at the ship's hull. The last-mentioned connection of the neutral line at the ship short circuits the voltaic cell created by the arrangement and the hull of the ship, acting as a negative electrode, deteriorates.

Presently, such solutions to the problem of hull deterioration have been the use of isolation transformers, electronic cathodic protection devices or sacrificial type zinc anode blocks.

Each of the above presently used solutions has drawbacks, however. The isolation transformers are high in cost, large and cumbersome, and have some residual leakage. The electronic cathodic devices likewise are high in cost and require a critical adjustment to balance out the Galvanic hull potential and must be located with great care. The location of the zinc anode blocks is even more critical and at best is a partial solution to the problem.

SUMMARY OF THE INVENTION

Accordingly, it is a general object of the present invention to provide a new and improved apparatus for minimizing the metallic deterioration of water going vessels or other metallic structures immersed in sea or fresh water.

It is a more specific object of the invention to provide apparatus of the above-described type which minimizes the deterioration of the metallic hulls of water going vessels when the latter are docked adjacent a docking sight and connected to a power source grounded at the dock.

It is another object of the present invention to provide apparatus of the above-described type which is simple in construction, relatively low in cost, compact and the placement of which is of minimal importance to its operation.

Briefly, a preferred embodiment of the present invention includes the use of silicon diodes in the electrical connection between a shore power source grounded at a dock and fabricated of a metal dissimilar from the metallic hull of a ship moored thereat and receiving power from the power source. The diodes are connected in the grounded neutral conductor from the power source which is also grounded at the ship's hull. The intrinsic junction voltage drop of the diodes connected to the ship's neutral and to the hull prevents the flow of current due to voltaic cell action between the metallic hull of the ship and metal dock both immersed in an electrolyte (water including minerals). The diodes, however, easily pass surge current to ground in the case of a fault or electrical short.

Preferably, two pair of silicon rectifiers are utilized in a back-to-back configuration. The intrinsic junction voltage drop of each of the diodes is approximately 0.8 volts, thus each pair provides a 1.6 volt drop to block the current flow in the voltaic cell created by the ship and dock arrangement.

DETAILED DESCRIPTION

Figure 1:
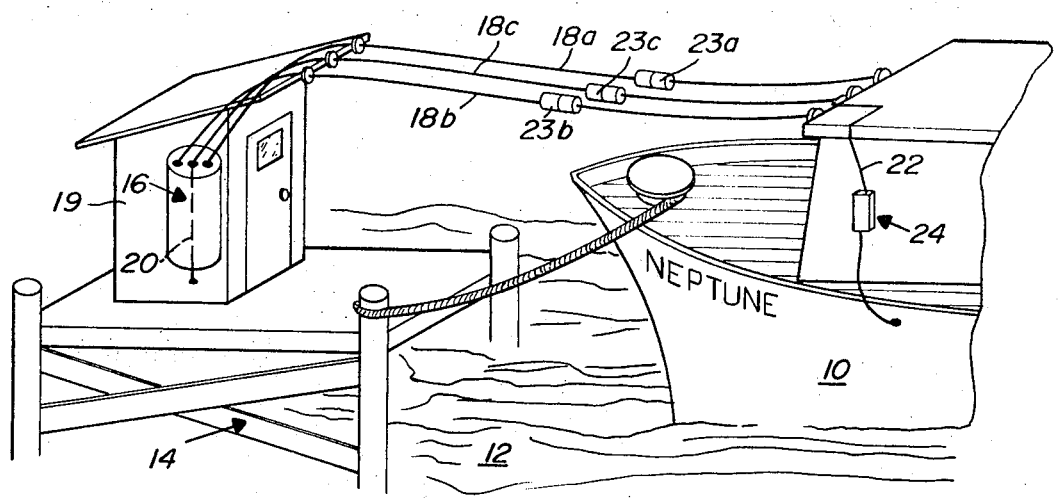
FIG. 1 is a perspective view of an arrangement including a ship docked adjacent a pier from which power is supplied to the ship during the docking period.

Referring now in greater detail to the drawing, FIG. 1 thereof shows a water going vessel designated generally by the numeral 10 immersed in sea water 12 having the usual mineral content and docked adajcent a pier designated generally by the numeral 14. The ship's hull is constructed of a metal, such as, for example, aluminum or the like and the pier 14 is constructed of a dissimilar metallic material, such as, for example, iron or steel.

An AC power source, herein shown as a distribution transformer 16 located on the dock in a power shed 19, provides power via cables to the ship for operating electrical equipment, etc., thereon. The power cables comprise two "hot" conductors 18a, 18b and a neutral conductor 18c; 220 volts are provided across leads 18a, 18b and 110 volts can be obtained between each of the hot conductors and the neutral line. The neutral conductor 18c at the transformer is grounded at the steel dock via conductor 20 and the neutral line 18c at the ship's side is grounded to the metallic hull via conductor 22. Connectors 23a, 23b, 23c are provided to disconnect the ship from shore power upon sailing.

The water in which the ship and dock are immersed contains the usual mineral content and therefore acts as an electrolyte. The dock and ship, in the case wherein the former is of steel and the latter is of aluminum or the like metals or include such metals, serve as positive and negative electrodes, respectively, in a voltaic cell arrangement. In the case wherein the dock may be of a non-metallic material, but in close proximity to the harbor bottom whereat the power source is grounded, the harbor bottom which includes conductive, dissimilar material, serves as the positive electrode in the voltaic cell arrangement. The electrical conductor interposed between the dock and ship and grounded thereat, respectively, completes the circuit for the voltaic cell. The hull of the ship, acting as the negative electrode plates out on the positive dock, thereby producing deterioration of the hull. The current flow produced in the process results in the provision of from 0.7 to 0.9 volts from the cell.

To minimize the latter occurrence, Galvanic deterioration suppression apparatus 24 according to the invention is inserted in line 22 connected between the neutral line 18c and the ground point on the hull of the ship to prevent the flow of current produced by the voltaic cell effect.

Figure 2:
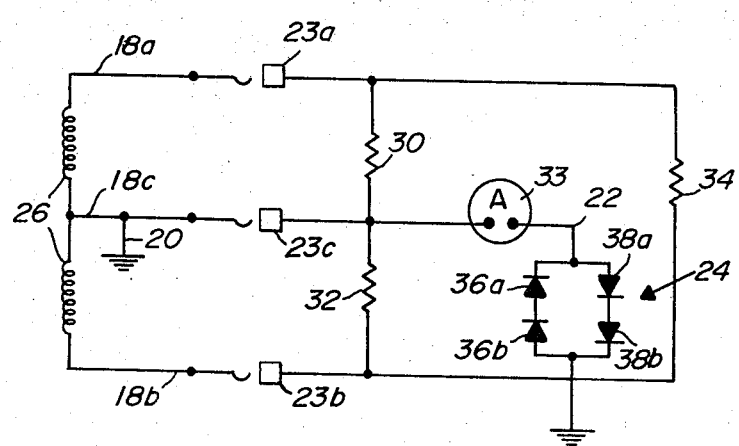
FIG. 2 is a schematic diagram of the electrical power circuit between the dock and ship of FIG. 1.

A schematic diagram of the arrangement of FIG. 1 is shown in FIG. 2. Coils 26 represent the power transformer 16 mounted on dock 14 and connected via conductors 18a–18c to the electrical loads, 30, 32, 34 on the ship 10. As can be seen, the neutral line 18c of the conductors is grounded via lead 20 at dock side 14 and the neutral conductor is grounded to the ship's hull via conductor 22 at the ship. In addition, an ammeter 33 is placed in series with the neutral lead 18c to determine the current being drawn from the power transformer 26.

Looking in greater detail at apparatus 24, the latter includes two pairs of oppositely poled silicon diodes 36a, 36b, and 38a, 38b, interposed between the neutral line 18c and the ship's ground. The intrinsic junction voltage drop of each of the diodes is approximately 0.8 volts. Thus, the voltage drop across each pair of series connected diodes is approximately 1.6 volts; the latter being sufficient to block current flow produced by a voltaic cell reaction in the system. While silicon diodes are recommended for use in the environment described, other diodes having proper junction voltage drops could be used equally as well.

Two pairs of back-to-back silicon diodes are provided for two purposes; the first being to suppress the voltaic cell effect in cases both wherein the hull acts as the negative electrode and wherein the hull acts as the positive electrode of the system; and secondly, to permit alternating current supplied by the transformer 16 to pass to ground both on positive and negative half cycles.

The location of the diodes as described is between the neutral line and ground, and may be either at the ship's side or at the dock side. Normally, however, the power source is grounded at the time for installation of the transformer, leaving only the location shown for the diode suppressor apparatus.

The silicon diodes serve well to block the voltaic cell action and thus prevent Galvanic deterioration of the ship's hull in the case described. The physical size of the diodes, it should be noted, should be such that they are able to withstand surge current upon opening of a breaker in the system, and to permit the passage of high alternating current during an electrical short or fault.

While a conventional circuit having a neutral connection has been shown and described, the apparatus of the invention will operate efficiently in a system having only a positive and ground lead. In the latter case, the apparatus is connected between the ship's ground and the ground lead of the system.

The Galvanic deterioration suppression apparatus described may be used also with off shore drilling rigs and the like metallic structures which are electrically insulated from ground and which receive power from a separate source including dissimilar metal or which is grounded at the sea bottom. The apparatus serves in the latter case to prevent deterioration of the metallic structure used in the drilling procedure due to the voltaic cell effect, as in the case of the ship.

Thus, the apparatus according to the invention provides an efficient and effective, low cost means for preventing Galvanic deterioration of the ship's hull when the ship is docked adjacent a pier of a dissimilar metal in water serving as an electrolyte, and from which the ship is receiving electrical power.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim

1. Apparatus for suppressing Galvanic deterioration of the hull of a vessel including metallic material wherein the latter is immersed in water acting as an electrolyte, adjacent a dock including metal dissimilar to the metal in said hull and receiving power from a power source grounded at the dock and connected via electrical conductor means to the vessel and grounded at the metallic hull material thereon, said apparatus including solid state means interposed between said electrical conductor means and ground and having a predetermined intrinsic junction voltage drop sufficient to prevent current flow through said conductor means due to the voltaic cell effect.

2. Apparatus as claimed in claim 1 wherein said metallic material of said hull includes aluminum and wherein said metallic material of said dock includes iron.

3. Apparatus as claimed in claim 1 wherein said solid state means includes a silicon diode.

4. Apparatus as claimed in claim 3 wherein two pair of oppositely poled silicon diodes are inserted in the grounded conductor means between said conductor and the ship's ground.

5. Apparatus for blocking current flow in a voltaic cell arrangement including a dock including metallic material, a ship having a hull including metal dissimilar from the metallic material of said dock, both said dock and said ship being immersed in water including minerals, and a power source grounded electrically at the dock and ship for supplying electrical power to the latter when the ship is moored at the dock, said apparatus including: semiconductor means connected between the grounded hull of the ship and dock and having a predetermined intrinsic junction voltage drop sufficient to prevent current flow due to the voltaic cell effect.

6. Apparatus as claimed in claim 5 wherein said semiconductor means includes a plurality of diodes connected electrically in series relation, wherein said ship's hull acts as the negative electrode in said voltaic cell arrangement and wherein said diodes are poled to block current flow to prevent plating out of said ship's hull material onto said dock.

7. Apparatus as claimed in claim 6 wherein said diodes are silicon diodes.

8. Apparatus for suppressing Galvanic deterioration of a structure including metallic material wherein the latter is immersed in water acting as an electrolyte in close proximity to and receiving power from a power source grounded at a location having conductive material dissimilar to the metal in said structure and connected via electrical conductor means to the structure and grounded at the metallic material thereon, said apparatus including solid state means interposed between said electrical conductor means and ground and having a predetermined intrinsic junction voltage drop sufficient to prevent current flow through the conductor means due to the voltaic cell effect.

9. Apparatus as claimed in claim 8 wherein said solid state means include first and second pairs of oppositely poled diodes.

10. Apparatus as claimed in claim 9 wherein said diodes are the silicon type.

* * * * *